(12) United States Patent
Miracolo et al.

(10) Patent No.: US 11,625,477 B2
(45) Date of Patent: Apr. 11, 2023

(54) AUTOMATED PASSWORD GENERATION

(71) Applicant: Capital One Services, LLC, McLean, VA (US)

(72) Inventors: Max Miracolo, Brooklyn, NY (US); Jacob Learned, Brooklyn, NY (US); Kaylyn S. Gibilterra, New York, NY (US); Michael Saia, New York, NY (US)

(73) Assignee: Capital One Services, LLC, McLean, VA (US)

( * ) Notice: Subject to any disclaimer, the term of this patent is extended or adjusted under 35 U.S.C. 154(b) by 315 days.

(21) Appl. No.: 16/993,050

(22) Filed: Aug. 13, 2020

(65) Prior Publication Data

US 2022/0050894 A1  Feb. 17, 2022

(51) Int. Cl.
| | |
|---|---|
| *G06F 21/00* | (2013.01) |
| *G06F 21/46* | (2013.01) |
| *G06N 5/04* | (2023.01) |
| *G06N 20/00* | (2019.01) |
| *G06Q 50/26* | (2012.01) |

(52) U.S. Cl.
CPC .............. *G06F 21/46* (2013.01); *G06N 5/04* (2013.01); *G06N 20/00* (2019.01); *G06Q 50/265* (2013.01)

(58) Field of Classification Search
CPC .......... G06F 21/46; G06N 5/04; G06N 20/00; G06Q 50/265
See application file for complete search history.

(56) References Cited

U.S. PATENT DOCUMENTS

| | | | |
|---|---|---|---|
| 8,769,607 B1 * | 7/2014 | Jerdonek ................. | G06F 21/31 726/4 |
| 9,524,393 B2 | 12/2016 | Aggarwal et al. | |
| 10,055,575 B2 | 8/2018 | Adams et al. | |
| 10,079,855 B2 | 9/2018 | Versteeg et al. | |
| 10,325,091 B2 | 6/2019 | Shapiro | |
| 2012/0042364 A1 * | 2/2012 | Hebert ................... | G06F 21/554 726/6 |
| 2018/0012014 A1 | 1/2018 | Sahin et al. | |
| 2020/0279050 A1 * | 9/2020 | Endler .................. | G06F 16/144 |
| 2021/0367961 A1 * | 11/2021 | Kuppa ................... | G06N 20/00 |

* cited by examiner

*Primary Examiner* — Mahfuzur Rahman
(74) *Attorney, Agent, or Firm* — Sterne, Kessler, Goldstein & Fox P.L.L.C.

(57) ABSTRACT

Disclosed herein are system, method, and device embodiments for implementing password suggestion. An embodiment operates by selecting one or more random terms from dictionary information, generating an alphanumeric string based on a password requirement, combining the one or more random terms and the alphanumeric string to form a generated password, determining a password strength of the generated password based on compromised password information, and presenting the generated password for selection by a user device when the password strength meets or exceeds a threshold value.

20 Claims, 3 Drawing Sheets

AUTOMATED PASSWORD GENERATION

BACKGROUND

Due to recent data breaches, computer hackers have gained access to voluminous lists of exposed username-password combinations. In some instances, these lists may be available for purchase on the dark web and other websites hosting illicit materials. Many users employ the same passwords across multiple websites, or employ commonly-used passwords. As such, these users may be susceptible to brute-force attacks using these exposed passwords, which can cause substantial financial and reputational loss to service providers and service users.

DETAILED DESCRIPTION

Provided herein are system, apparatus, device, method and/or computer program product embodiments, and/or combinations (including sub-combinations) thereof, for implementing password suggestions to a user.

Figure 1:
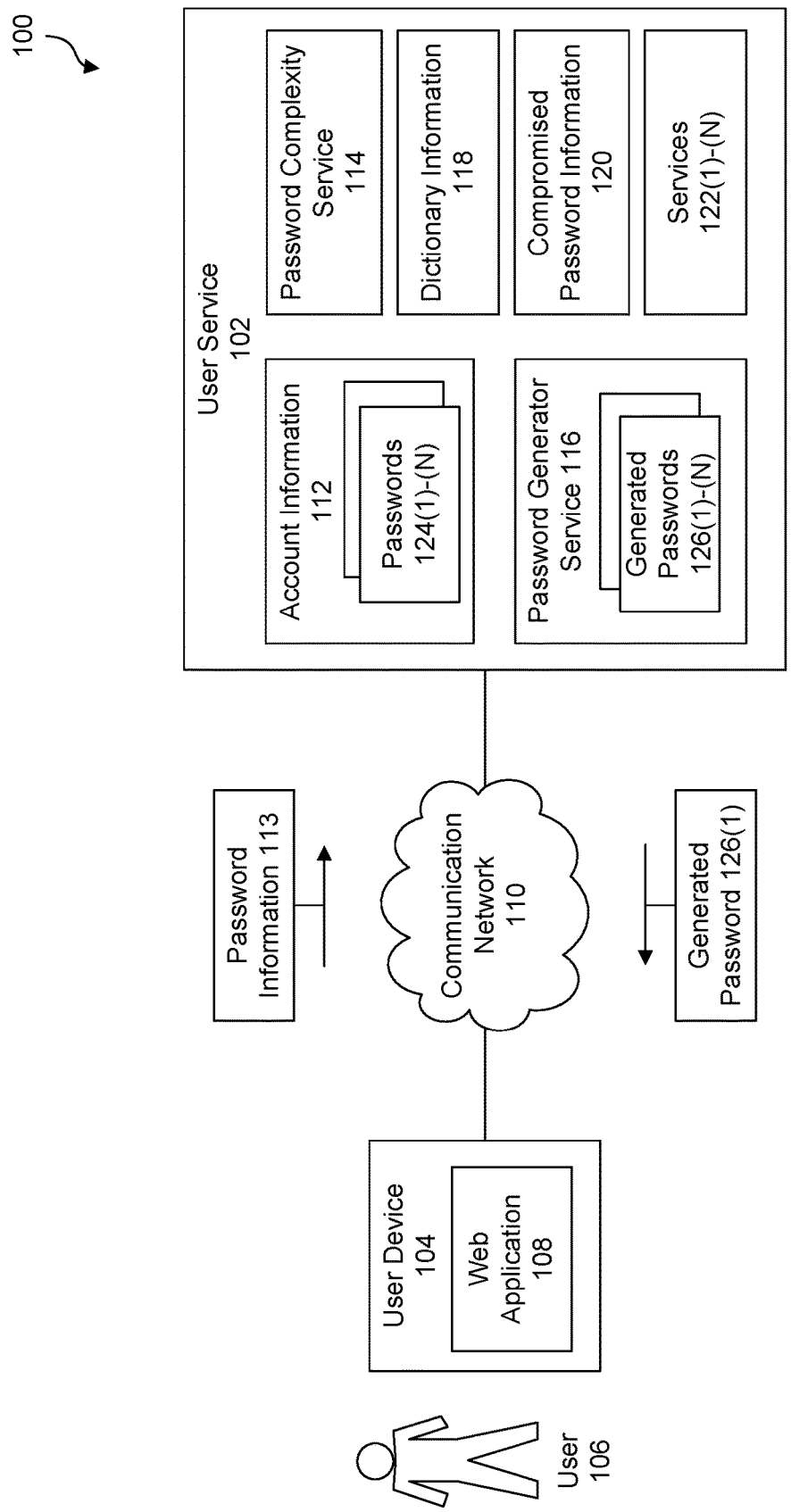
FIG. 1 is a block diagram of an example framework for implementing password suggestion, according to embodiments of the present disclosure.

FIG. 1 illustrates a diagram of an example framework for implementing password suggestion, according to embodiments of the present disclosure. As illustrated in FIG. 1, a password suggestion system 100 may include a user service 102 and a user device 104 associated with a user 106.

In some embodiments, the user service 102 may be an application server, a service provider, a web site, a web application, or a web platform. For example, the user service 102 may be a web platform of an institution that provides services to users, e.g., the user 106. As another example, the user service 102 may offer authentication as a service, and authenticate users on behalf of clients. The user service 102 may include a server or a group of servers. In an embodiment, the user service 102 may be hosted in a cloud computing environment. It may be appreciated that the user service 102 may not be cloud-based, or may be partially cloud-based. Such a cloud computing environment may include an environment that delivers computing as a service, with shared resources, services, etc. The cloud computing environment may provide computation, software, data access, storage, and/or other services that do not require end-user knowledge of a physical location and configuration of a system and/or a device that delivers the services.

Some examples of the user device 104 include smart phones and mobile communication devices; tablet computing devices; video game consoles; portable media players; digital video recorders (DVRs); wearable computing devices; desktops, laptops, netbooks and other portable computers; IoT (internet of things) devices; set-top boxes (STBs); and/or any other device capable of receiving data from the user service 102.

Further, the user 106 may employ a web application 108 of the user device 104 to access the user service 102. As used herein, and in some embodiments, a "web application" may refer to any program or software operable to run on the user device 104 using a communication network 110. In some embodiments, the web application 108 may be a client application executed in a web browser. Some examples of a web application 108 include media streaming, webmail, online retail sales, online banking, and online auctions. A "web browser," as referred to herein, may relate to a software application or a software application component for retrieving, rendering, and presenting information resources from the World Wide Web and/or other sources. Web browsers enable users to access and view documents and other resources located on remote servers, e.g., the user service 102. Some examples of web browser applications include Google Chrome™, Mozilla Firefox™, Microsoft Internet Explorer™, Opera™, and Apple Safari™.

The user service 102 and the user device 104 may communicate via the communication network 110. The communication network 110 may include any or all of a private network, personal area network (PAN), Local-Area Network (LAN), Wide-Area Network (WAN), or the Internet. Further, the connection between the user service 102, the user device 104, and/or the communication network 110 may be a wireless connection (e.g., Bluetooth, Wi-Fi connection, etc.), a wired connection (e.g., Ethernet, universal serial bus (USB), etc.), or a combination thereof.

As illustrated in FIG. 1, the user service 102 may include account information 112, a password complexity service 114, a password generator service 116, dictionary information 118 including a collection of words of a language, compromised password information 120 including a collection of exposed passwords, and services 122(1)-(N) (e.g., media streaming services, webmail services, online retail shopping services, online banking services, etc.). In some embodiments, the account information 112, dictionary information 118, and compromised password information 120 may be stored in one or more databases. As used herein, the term "database" refers to an organized collection of data. Some examples of databases include columnar databases, relational databases, key-store databases, graph databases, and document stores.

The compromised password information 120 may be a database including, for example, username-password combinations that have been exposed or otherwise made available to the public or a portion thereof, such as those passwords available on the dark web and other websites hosting illicit materials. The exposed passwords may have been collected from, for example, data breaches of username and password combinations. The compromised password information 120 may also include commonly-used passwords. The compromised password information 120 may be a locally-populated database, may include information from a variety of sources/collections of such data, or may be a combination of locally-sourced and publicly-sourced data. Further, the compromised password information 120 may be periodically updated to ensure that the password complexity service 114 is configured to provide fresh results.

The account information 112 may include account data associated with a plurality of users, e.g., the user 106. The account information 112 may include authentication information, authorization information, encryption information, user preferences, location information, biographical information, demographic information, special needs and disabilities, executed service agreements, contact information, usage history, etc. In some embodiments, the user service 102 may be a web platform of a financial institution, and the account information 112 may include information about financial accounts including account balance information, financial transaction history, transaction location information, user activity, user roles, user workflows, user settings, etc.

Further, as illustrated in FIG. 1, the account information 112 may include passwords 124(1)-(N) (e.g., username/password combinations) for the users. As an example, the password 124(1) may be used to authenticate the user 106 to the user service 102. Performing the authentication process ensures that the user device 104 is associated with the user 106 having an account with the user service 102. As used herein, in some embodiments, "authentication" may refer to a process by which an entity (e.g., a user, a device, or a process) makes their identity known to a computing system (e.g., the user service 102).

As described in detail herein, in some instances, the user 106 may endeavor to set the password 124(1) during a registration process or update the password 124(1). The user device 104 may send the proposed password information 126 to the user service 102 via the web application 108. In some embodiments, the proposed password information 126 may be encrypted for security purposes in transit over the communication network 110.

The password complexity service 114 may determine the strength of a proposed password (e.g., the proposed password information 126) based at least in part on a password policy, a distance function, and/or the compromised password information 120. In some embodiments, a password policy may require or otherwise establish the preference for a minimum password length, the inclusion of uppercase or lowercase characters, the inclusion of special characters such as numerical digits, an absence of personal information and other blacklisted information, and/or a required distance from one or more exposed passwords. The strength of the password may be determined, for example, in accordance with industry standards, such as a NIST standard.

In some examples, the password complexity service 114 may determine the strength of a proposed password based at least in part on determining whether the proposed password meets the requirements of a defined password policy. Further, in some examples, the password complexity service 114 may determine the strength of a proposed password based at least in part on determining a distance between a proposed password and the exposed passwords of the compromised password information 120. For instance, the compromised password information 120 may include the exposed password "hello123." One of skill in the art will recognize that compromised password information 120 may include many more example exposed, common, or simple passwords, and "hello123" is merely an example used herein. The password complexity service 114 may determine the string distance (e.g., string similarity) between "hello123" and a proposed password using a distance function. Some examples of a distance function include the Levenshtein distance function, the Damerau-Levenshtein distance function, etc. As used herein, the term "string similarity" may be a metric that measures distance between two text strings for approximate string matching or comparison. Further, the password complexity service 114 may determine that the strength of a password is sufficient when the proposed password meets the requirements of the password policy, and the distance between the proposed password and the "hello123" example password meets or exceeds a threshold of a security policy. Further, separate password strength analyses may be performed between the proposed password and multiple passwords in the compromised password information 120. For example, separate password strength analyses may be performed between the proposed password and all passwords in the compromised password information 120.

In some embodiments, the password complexity service 114 may employ machine learning techniques and/or pattern recognition techniques to determine the strength of a password. For example, the user service 102 may generate a machine learning model (e.g., a classification model for classifying input) configured to determine the strength of a password based at least in part on the compromised password information and historic user information. Further, the machine learning model may determine a complexity score of a password, and the password complexity service 114 may determine the strength of a password based at least in part on comparing the complexity score to a threshold value. The password complexity service 114 may utilize hidden Markov models, decision trees, regression models, support vector machines, or artificial neural networks for determining the strength of a password.

The password generator service 116 may generate passwords 128(1)-(N) for use by users (e.g., the user 106). For example, in response to the password complexity service 114 determining that the proposed password information 126 has a password strength less than a threshold, the password generator service 116 may generate a password 128 to suggest to the user 106, where the generated password 128 is more secure and complex than the proposed password. In some embodiments, the password generator service 116 may determine a generated password 128(1) by selecting two terms at random from the dictionary information 118, and combining the two terms with an alphanumeric string that includes a minimum amount of numerical digits. For example, the two terms selected at random from the dictionary may be "respiration" and "verse", while the alphanumeric string is "2421," making the generated password 128(1) "Respiration2421verse." In some other embodiments, the password generator service 116 may combine one or more random terms with an alphanumeric string to generate the password 128(1), although a person of skill in the art will recognize that a password generated using two random words may be stronger than a password generated using only one random word. In still other embodiments, the password generator service 116 may combine multiple random terms without an alphanumeric string to generate the password 128(1).

Once the generated password 128(1) has been determined, the password generator service 116 may employ the password complexity service 114 to determine whether the strength of the generated password 128(1) is sufficient. For example, the password complexity service 114 may determine whether the generated password 128(1) meets the requirements of the password policy, and whether the distance between the proposed password and the words of the compromised password information 120 meets or exceeds a threshold. If the strength of the generated password 128(1) is sufficient, the user service 102 may send the generated password 128(1) to the web application 108, and the web application 108 may present the generated password 128(1) to the user 106. Further, the user 106 may select the generated password 128(1) for use via the web application 108. In response to the user 106 selecting the generated password 128(1) for use, the user service 102 may set the generated password 128(1) as the password 124(1) for the user 106(1) in the account information 112.

Figure 2:
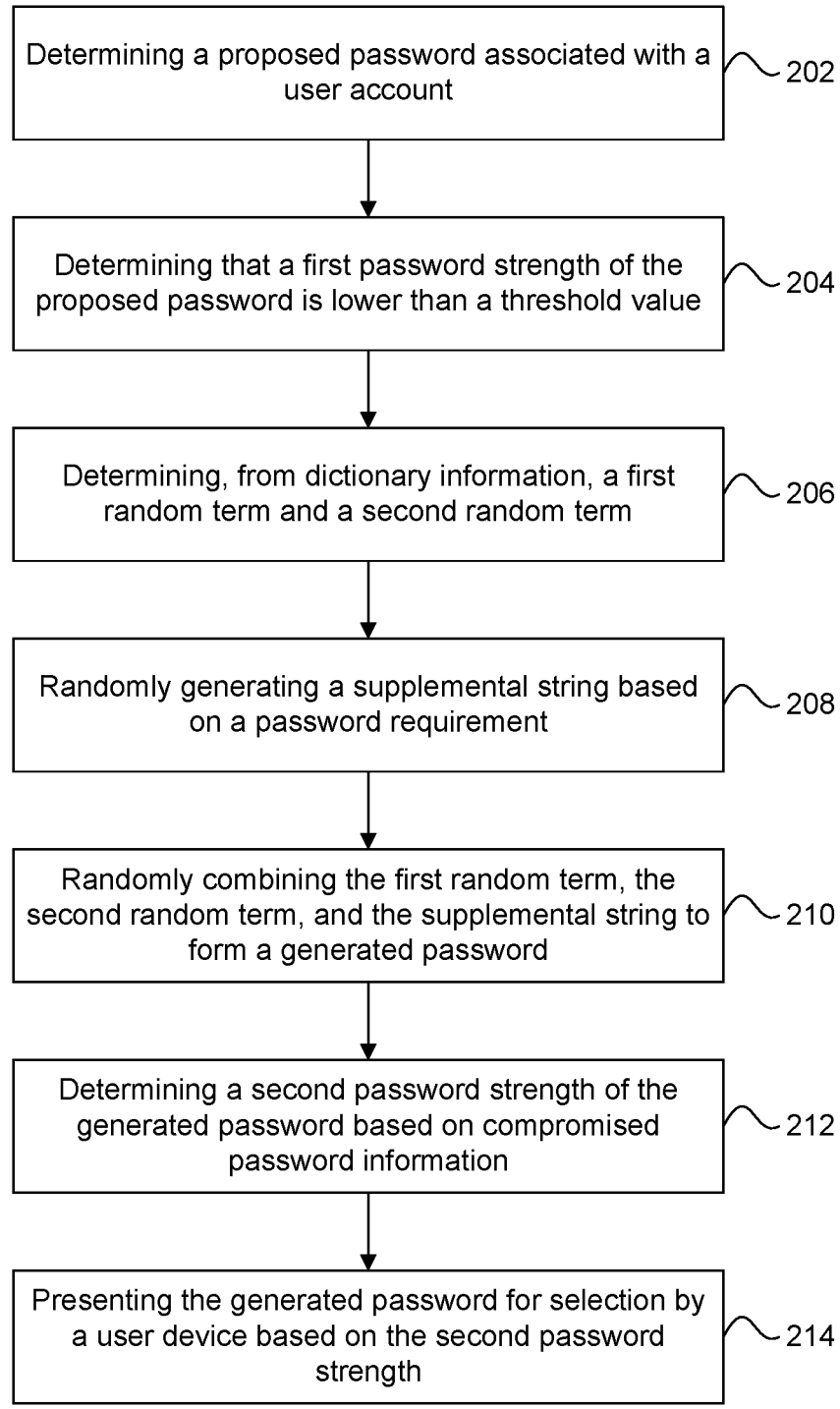
FIG. 2 is a flowchart illustrating a process implemented by a system for password suggestion, according to embodiments of the present disclosure.

FIG. 2 is a flowchart illustrating a process for implementing password suggestion, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed in all embodiments. Further, some of the steps may be performed simultaneously, or in a different order than shown in FIG. 2, as will be understood by a person of ordinary skill in the art.

Method 200 shall be described with reference to FIG. 1. However, method 200 is not limited to those example embodiments.

In 202, a user service may receive a proposed password associated with a user account. For example, the web application 108 may send the proposed password information 126 during a registration process, as part of a request to change the password 124(1), or in response to the expiration of the password 124(1).

In 204, the user service may determine that a first password strength of the proposed password is lower than a first threshold value. For example, the password complexity service 114 may determine that strength of the proposed password information 126 falls below a threshold.

In 206, the user service may select, from dictionary information, one or more random terms. For example, the password generator service 116 may randomly select two words (e.g., "respiration" and "verse") from the dictionary information 118.

In 208, the user service may generate an alphanumeric string based on a password requirement. For example, the password generator service 116 may generate a random number (e.g., 2421) including a predetermined minimum amount of digits in accordance with a password policy.

In 210, the user service may combine the one or more random terms and the alphanumeric string to form a generated password. For example, the password generator service 116 may combine the randomly-selected words and the random number to form the generated password 128(1) (e.g., "Respiration2421verse").

In 214, the user service may determine a second password strength of the generated password based on compromised password information. For example, the password complexity service 114 may determine the strength of the generated password 128(1). In some embodiments, the password complexity service 114 may determine the strength of the generated password 128(1) based on determining distance values between the generated password 128(1) and the exposed passwords of the compromised password information 120 using a distance function. Further, the strength of the password may be determined based on comparing the determined distance values to a distance threshold value. In some embodiments, the first threshold value used in step 204 and the second threshold value used in step 214 may be identical. In some other embodiments, one of the threshold values may be higher than the other in accordance with a security policy.

In 216, the user service may present the generated password for selection by a user device when the second password strength meets or exceeds a second threshold value. For example, if the distance values between the generated password 128(1) and the exposed passwords in compromised password information 120 exceed or meet a distance threshold, the user service 102 may send the generated password 128(1) to the web application 108, and the web application 108 may present the generated password 128(1) to the user 106 in a graphical user interface. Further, the user 106 may select the generated password 128(1) for use via the web application 108. In response to the user 106 selecting the generated password 128(1), the user service 102 may set the generated password 128(1) as the password 124(1) for the user 106(1) in the account information 112.

If the user does not select the generated password 128(1) for use (e.g., if the user feels that they cannot remember generated password 128(1), then steps 206-216 may be repeated as many times as necessary until the user selects a generated password for use.

Figure 3:
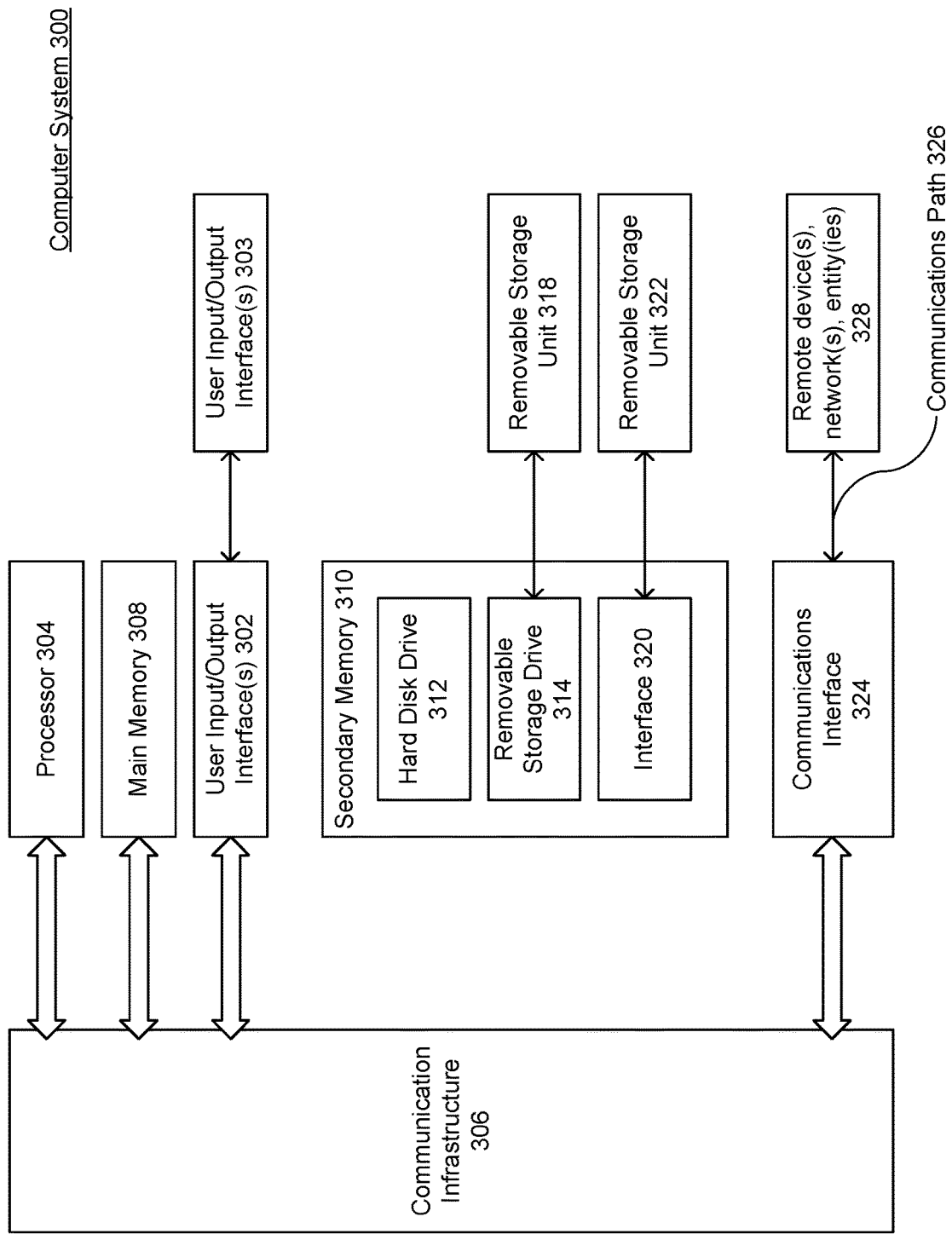
FIG. 3 illustrates a computer system, according to example embodiments of the present disclosure.

FIG. 3 is a block diagram of example components of system 300. To implement one or more example embodiments, one or more systems 300 may be used, for example, to implement embodiments discussed herein, as well as combinations and sub-combinations thereof. System 300 may include one or more processors (also called central processing units, or CPUs), such as a processor 304. Processor 304 may be connected to a communication infrastructure or bus 306.

System 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

System 300 may also include a main or primary memory 308, such as random access memory (RAM). Main memory 308 may include one or more levels of cache. Main memory 308 may have stored therein control logic (i.e., computer software) and/or data.

System 300 may also include one or more secondary storage devices or memory 310. Secondary memory 310 may include, for example, a hard disk drive 312 and/or a removable storage device or drive 314.

Removable storage drive 314 may interact with a removable storage unit 318. Removable storage unit 318 may include a computer usable or readable storage device having stored thereon computer software (control logic) and/or data. Removable storage unit 318 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 314 may read from and/or write to removable storage unit 318.

Secondary memory 310 may include other means, devices, components, instrumentalities or other approaches for allowing computer programs and/or other instructions and/or data to be accessed by system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

System 300 may further include a communication or network interface 324. Communication interface 324 may enable system 300 to communicate and interact with any combination of external devices, external networks, external entities, etc. (individually and collectively referenced by reference number 328). For example, communication interface 324 may allow system 300 to communicate with external or remote devices 328 over communications path 326, which may be wired and/or wireless (or a combination thereof), and which may include any combination of LANs, WANs, the Internet, etc. Control logic and/or data may be transmitted to and from system 300 via communication path 326.

System 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms. In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, system 300, main memory 308, secondary memory 310, and removable storage units 318 and 322, as well as tangible articles of manufacture embodying any combination of the foregoing. Such control logic, when executed by one or more data processing devices (such as user service 102 or user device 104), may cause such data processing devices to operate as described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method comprising:
   receiving a proposed password associated with a user account;
   determining that a first password strength of the proposed password is lower than a first threshold value;
   selecting, from dictionary information, one or more random terms;
   generating an alphanumeric string based on a password requirement;
   combining the one or more random terms and the alphanumeric string to form a generated password;
   determining a second password strength of the generated password based on compromised password information; and
   presenting the generated password for selection by a user device when the second password strength meets or exceeds a second threshold value.

2. The method of claim 1, wherein determining that the first password strength is lower than the first threshold value comprises determining the first password strength based on the compromised password information.

3. The method of claim 1, wherein determining the second password strength comprises:
   determining a distance result by applying a distance function to the generated password and a compromised password of the compromised password information; and
   comparing the distance result to a distance threshold associated with a password strength policy.

4. The method of claim 1, wherein determining the second password strength comprises:
   generating a classification model based at least in part on the compromised password information; and
   classifying the generated password based at least in part on the classification model.

5. The method of claim 1, further comprising:
   receiving a selection of the generated password; and
   setting an account password to the generated password based on the selection of the generated password.

6. The method of claim 1, further comprising modifying the dictionary information based on the compromised password information.

7. The method of claim 1, wherein the alphanumeric string is a numeric value consisting of no less than a predetermined amount of numbers.

8. The method of claim 1, wherein the one or more random terms include a first random term and a second random term.

9. A system comprising:
   a dictionary database comprising dictionary terms;
   a compromised password information containing compromised passwords; and
   one or more processors configured to:
      receive proposed password information from a user device;
      determine a first password strength based on the proposed password information;
      receive, from the dictionary database, one or more random terms based at least in part on the first password strength being less than a predetermined threshold;
      generate an alphanumeric string based on a password requirement;

combine the one or more random terms and the alphanumeric string to form a generated password;
determine, based on the compromised password information, a second password strength of the generated password; and
present, via the user device, the generated password for selection based on the second password strength.

10. The system of claim 9, wherein to determine the first password strength, the one or more processors are configured to determine the first password strength using the compromised password information.

11. The system of claim 9, wherein to determine the first password strength, the one or more processors are configured to:
determine a string distance between the generated password and a compromised password of the compromised password information; and
compare the string distance to a distance threshold associated with a password strength policy.

12. The system of claim 9, wherein to determine the second password strength, the one or more processors are configured to:
generate a classification model based at least in part on the compromised password information; and
classify the generated password based at least in part on the classification model.

13. The system of claim 9, wherein the one or more processors are configured to modify the dictionary database based on the compromised password information.

14. The system of claim 9, wherein the alphanumeric string is a numeric value consisting of no less than a predetermined amount of numbers.

15. A non-transitory computer-readable device having instructions stored thereon that, when executed by at least one computing device, cause the at least one computing device to perform operations comprising:
receiving a proposed password associated with a user account;
determining that a first password strength of the proposed password is lower than a first threshold value;
selecting, from dictionary information, one or more random terms;
generating an alphanumeric string based on a password requirement;
combining the one or more random terms and the alphanumeric string to form a generated password;
determining a second password strength of the generated password based on compromised password information; and
presenting the generated password for selection by a user device when the second password strength meets or exceeds a second threshold value.

16. The non-transitory computer-readable device of claim 15, wherein determining that the first password strength of the proposed password is lower than the first threshold value comprises determining the first password strength based on the compromised password information.

17. The non-transitory computer-readable device of claim 15, wherein determining the second password strength comprises:
determining a distance result by applying a distance function to the generated password and a compromised password of the compromised password information; and
comparing the distance result to a distance threshold associated with a password strength policy.

18. The non-transitory computer-readable device of claim 15, wherein determining the second password strength comprises:
generating a classification model based at least in part on the compromised password information; and
classifying the generated password based at least in part on the classification model.

19. The non-transitory computer-readable device of claim 15, wherein the first threshold value and the second threshold value are identical.

20. The non-transitory computer-readable device of claim 15, wherein the operations further comprise modifying the dictionary information based on the compromised password information.

* * * * *